US012575471B2

(12) United States Patent
Schroeder

(10) Patent No.: US 12,575,471 B2
(45) Date of Patent: Mar. 17, 2026

(54) DOWNFORCE CONTROL SYSTEM FOR A FINISHING FRAME OF A TILLAGE IMPLEMENT

(71) Applicant: CNH Industrial America LLC, New Holland, PA (US)

(72) Inventor: Brittany Ann Schroeder, Bunker Hill, IN (US)

(73) Assignee: CNH INDUSTRIAL AMERICA LLC, New Holland, PA (US)

( * ) Notice: Subject to any disclaimer, the term of this patent is extended or adjusted under 35 U.S.C. 154(b) by 716 days.

(21) Appl. No.: 17/962,738

(22) Filed: Oct. 10, 2022

(65) Prior Publication Data

US 2024/0114815 A1 Apr. 11, 2024

(51) Int. Cl.
*A01B 63/114* (2006.01)
*A01B 49/02* (2006.01)
(Continued)

(52) U.S. Cl.
CPC ............ *A01B 63/114* (2013.01); *A01B 63/32* (2013.01); *A01B 79/005* (2013.01)

(58) Field of Classification Search
CPC .. A01B 63/11–1145; A01B 49/00–065; A01B 63/114; A01B 63/32; A01B 79/005; A01B 49/027
See application file for complete search history.

(56) References Cited

U.S. PATENT DOCUMENTS

| | | | |
|---|---|---|---|
| 4,067,395 A | 1/1978 | Verhoff | |
| 5,622,226 A | 4/1997 | Hausman et al. | |

(Continued)

FOREIGN PATENT DOCUMENTS

| | | |
|---|---|---|
| AU | 2020201227 | 3/2020 |
| CN | 107558519 | 1/2018 |

(Continued)

OTHER PUBLICATIONS

Mohtasebi et al., "Design and Evaluation of Automatic Agricultural Land Leveling Control System for Scraper," International Journal Of Agriculture & Biology, 2007, 5 pgs.
(Continued)

*Primary Examiner* — Adam J Behrens
(74) *Attorney, Agent, or Firm* — Fletcher Yoder, P.C.

(57) ABSTRACT

A downforce control system for a finishing frame of a tillage implement includes a controller having a processor and a memory. The controller is configured to receive a sensor signal indicative of vibration of the finishing frame. The finishing frame is configured to be movably coupled to a main frame of the tillage implement and to be urged toward a surface of soil via application of a frame downforce from a frame downforce actuator. The controller is also configured to compare a magnitude of the vibration to a maximum threshold magnitude. Furthermore, the controller is configured to output an information signal to a user interface indicative of the frame downforce applied to the finishing frame being insufficient and/or control the frame downforce actuator to increase the frame downforce applied to the finishing frame in response to determining the magnitude of the vibration is greater than the maximum threshold magnitude.

18 Claims, 5 Drawing Sheets

(51) Int. Cl.
  *A01B 63/32* (2006.01)
  *A01B 79/00* (2006.01)

(56) References Cited

U.S. PATENT DOCUMENTS

| | | | | |
|---|---|---|---|---|
| 9,664,249 | B2* | 5/2017 | Kowalchuk | ............ A01B 63/32 |
| 9,723,776 | B2* | 8/2017 | Sporrer | ............... A01B 29/048 |
| 9,775,278 | B2* | 10/2017 | Zemenchik | ........... A01B 63/32 |
| 10,045,475 | B2* | 8/2018 | Steinlage | ............ A01B 49/027 |
| 10,066,361 | B2 | 9/2018 | Jewell et al. | |
| 10,485,155 | B2* | 11/2019 | Henry | ................. A01B 49/027 |
| 10,750,655 | B2* | 8/2020 | Henry | ................... A01B 76/00 |
| 11,208,777 | B2 | 12/2021 | Briggs | |
| 2006/0021769 | A1* | 2/2006 | Ankenman | ............ A01B 49/02 |
| | | | | 172/156 |
| 2015/0053433 | A1* | 2/2015 | Kovach | ............... A01B 49/027 |
| | | | | 172/1 |
| 2019/0387658 | A1* | 12/2019 | Henry | ................... A01B 76/00 |
| 2020/0178454 | A1* | 6/2020 | Knobloch | ........... A01B 63/1115 |
| 2020/0260633 | A1* | 8/2020 | Kovach | ................. A01B 71/02 |
| 2021/0062463 | A1 | 3/2021 | Zell et al. | |
| 2022/0240438 | A1* | 8/2022 | Thompson | ............ A01C 5/064 |

FOREIGN PATENT DOCUMENTS

| | | | |
|---|---|---|---|
| CN | 207499025 | 6/2018 | |
| CN | 214070548 | 8/2021 | |
| EP | 2671439 A1 * | 12/2013 | ............ A01B 3/112 |
| EP | 3420790 | 1/2019 | |
| IN | 202011039711 | 3/2022 | |
| IN | 202011039737 | 3/2022 | |

OTHER PUBLICATIONS

Screen capture from YouTube video clip entitled "4R Hydraulic Down Pressure Kit", uploaded on Dec. 9, 2015 by John Deere. Retrieved from Internet: https://www.youtube.com/watch?v=IKJUxLgnilk.
Ecolo-Tiger 875 Disk Ripper, 2021, Case IH Agriculture, 16 pgs.

* cited by examiner

DOWNFORCE CONTROL SYSTEM FOR A FINISHING FRAME OF A TILLAGE IMPLEMENT

BACKGROUND

The present disclosure relates generally to a downforce control system for a finishing frame of a tillage implement.

Certain agricultural implements include ground engaging tools configured to interact with soil. For example, a tillage implement may include tillage points and/or disc blades configured to break up the soil for subsequent planting or seeding operations. The tillage points and/or disc blades may be coupled to a main frame of the tillage implement. In addition, the tillage implement may include a finishing frame movably coupled to the main frame. The finishing frame may support finishing discs and/or finishing reel(s), and the finishing frame may be urged toward the soil surface (e.g., via hydraulic cylinder(s), etc.). For example, prior to tillage operations, an operator may select a fluid pressure for the hydraulic cylinder(s) that urge the finishing frame toward the soil surface (e.g., based on expected soil conditions, residue coverage, etc.). While the tillage implement is operating in certain regions of a field, the finishing frame may bounce (e.g., due to rough terrain, uneven residue coverage, etc.), thereby causing varying interactions between the finishing discs/finishing reel(s) and the soil. As a result, soil levelness may be reduced, thereby resulting in water ponding and/or reduced crop yield.

BRIEF DESCRIPTION

In certain embodiments, a downforce control system for a finishing frame of a tillage implement includes a controller having a processor and a memory. The controller is configured to receive a sensor signal indicative of vibration of the finishing frame. The finishing frame is configured to be movably coupled to a main frame of the tillage implement and to be urged toward a surface of soil via application of a frame downforce from a frame downforce actuator. The controller is also configured to compare a magnitude of the vibration to a maximum threshold magnitude. Furthermore, the controller is configured to output an information signal to a user interface indicative of the frame downforce applied to the finishing frame being insufficient and/or control the frame downforce actuator to increase the frame downforce applied to the finishing frame in response to determining the magnitude of the vibration is greater than the maximum threshold magnitude.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
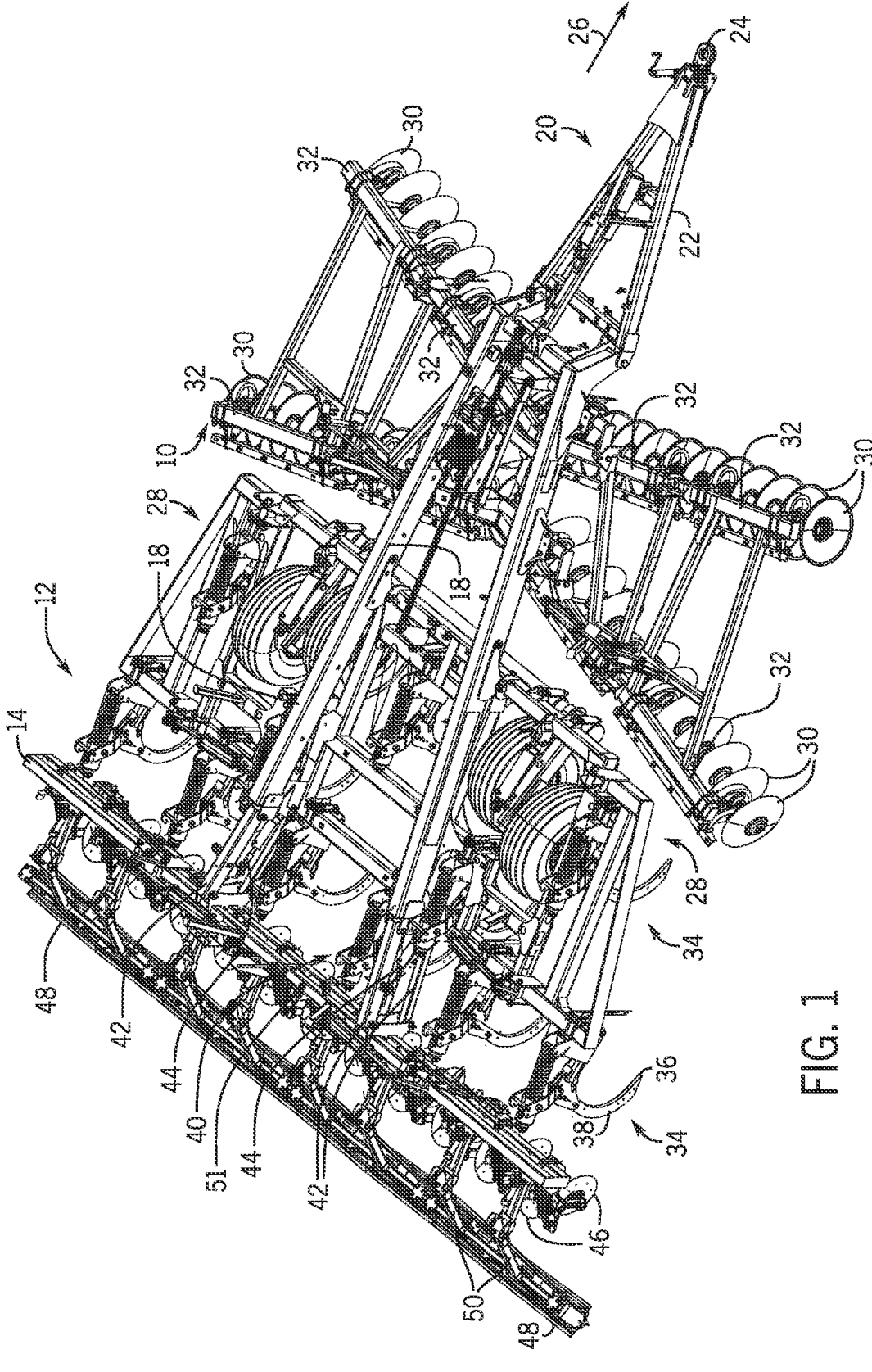
FIG. 1 is a perspective view of an embodiment of a tillage implement having a downforce control system for a finishing frame of the tillage implement.

FIG. 1 is a perspective view of an embodiment of a tillage implement 10 having a downforce control system 12 for a finishing frame 14 of the tillage implement 10. In the illustrated embodiment, the tillage implement 10 is a primary tillage implement having multiple ground engaging tools configured to till soil. As illustrated, the tillage implement 10 includes a main frame 18 and a hitch assembly 20 coupled to the main frame 18. In the illustrated embodiment, the hitch assembly 20 includes a hitch frame 22 and a hitch 24. The hitch frame 22 is pivotally coupled to the main frame 18 via pivot joint(s), and the hitch 24 is configured to couple to a corresponding hitch of a work vehicle (e.g., tractor), which is configured to tow the tillage implement 10 through a field along a direction of travel 26. While the hitch frame 22 is pivotally coupled to the main frame 18 in the illustrated embodiment, in other embodiments, the hitch frame may be movably coupled to the main frame by a linkage assembly (e.g., four bar linkage assembly, etc.) or another suitable assembly/mechanism that enables the hitch to move along a vertical axis relative to the main frame, or the hitch frame may be rigidly coupled to the main frame.

As illustrated, the tillage implement 10 includes wheel assemblies 28 movably coupled to the main frame 18. In the illustrated embodiment, each wheel assembly 28 includes a wheel frame and a wheel rotatably coupled to the wheel frame. The wheels of the wheel assemblies 28 are configured to engage the surface of the soil, and the wheel assemblies 28 are configured to support at least a portion of the weight of the tillage implement 10. In the illustrated embodiment, each wheel frame is pivotally coupled to the main frame 18, thereby facilitating adjustment of the vertical position of the respective wheel(s). However, in other embodiments, at least one wheel frame may be movably coupled to the main frame by another suitable connection (e.g., sliding connection, linkage assembly, etc.) that facilitates adjustment of the vertical position of the respective wheel(s).

In the illustrated embodiment, the tillage implement 10 includes disc blades 30 configured to engage a top layer of the soil. As the tillage implement 10 is towed through the field, the disc blades 30 are driven to rotate, thereby breaking up the top layer of the soil. In the illustrated embodiment, the disc blades 30 are arranged in two rows. However, in other embodiments, the disc blades may be arranged in more or fewer rows (e.g., 1, 3, 4, 5, 6, or more). Furthermore, in the illustrated embodiment, each row of disc blades 30 includes four gangs of disc blades 30. While the tillage implement 10 includes eight gangs of disc blades 30 in the illustrated embodiment, in other embodiments, the tillage implement may include more or fewer gangs of disc blades (e.g., 2, 4, 6, 10, 12, or more). Furthermore, the gangs of disc blades may be arranged in any suitable configuration on the implement frame.

The disc blades 30 of each gang are non-rotatably coupled to one another by a respective shaft, such that the disc blades 30 of each gang rotate together. Each shaft is rotatably coupled to a respective disc blade support 32, which is configured to support the gang, including the shaft and the disc blades 30. Each disc blade support 32 may include any suitable structure(s) configured to support the respective gang (e.g., including a square tube, a round tube, a bar, a truss, other suitable structure(s), or a combination thereof). While the disc blades 30 supported by each disc blade support 32 are arranged in a respective gang (e.g., non-rotatably coupled to one another by a respective shaft) in the illustrated embodiment, in other embodiments, at least a portion of the disc blades supported by at least one disc blade support (e.g., all of the disc blades supported by the disc blade support) may be arranged in another suitable configuration (e.g., individually mounted and independently rotatable, mounted in groups and individually rotatable, etc.). For example, in certain embodiments, a first portion of the disc blades supported by a disc blade support may be arranged in a gang, and a second portion of the disc blades supported by the disc blade support may be individually mounted and independently rotatable.

In the illustrated embodiment, the tillage implement 10 includes tillage point assemblies 34 coupled to the main frame 18. The tillage point assemblies 34 are configured to engage the soil at a greater depth than the disc blades 30, thereby breaking up a lower layer of the soil. In the illustrated embodiment, each tillage point assembly 34 includes a tillage point 36 and a shank 38. The shank 38 is configured to position the tillage point 36 at a target depth beneath the soil surface, and the tillage point 36 is configured to break up the soil. The shape of each tillage point 36, the arrangement of the tillage point assemblies 34, and the number of the tillage point assemblies 34 may be selected to control tillage within the field.

Furthermore, the tillage implement 10 includes a finishing frame 14 movably coupled to the main frame 18. In the illustrated embodiment, the finishing frame 14 is movably coupled to the main frame 18 by a linkage assembly 40. The linkage assembly 40 includes two sets of links 42, and each set of links 42 forms a four-bar linkage (e.g., parallel linkage) between the finishing frame 14 and the main frame 18, thereby enabling vertical movement of the finishing frame 14 relative to the main frame 18. In addition, the downforce control system 12 includes two frame downforce actuators 44 configured to apply a frame downforce to the finishing frame 14, thereby urging the finishing frame 14 toward the soil surface. While the downforce control system 12 includes two frame downforce actuators 44 in the illustrated embodiment, in other embodiments, the downforce control system may include more or fewer frame downforce actuators (e.g., 1, 3, 4, or more). Furthermore, while the linkage assembly 40 includes two sets of links 42 in the illustrated embodiment, in other embodiments, the linkage assembly may include more or fewer sets of links (e.g., 1, 3, 4, or more). In addition, while the linkage assembly includes four-bar linkages in the illustrated embodiment, in other embodiments, the linkage assembly may include any other/ additional suitable linkage(s) configured to movably couple the finishing frame to the main frame (e.g., one or more links pivotally coupled to the main frame and to the finishing frame, etc.). Furthermore, in the illustrated embodiment, the finishing frame 14 has a center section and two wing sections. The wing sections are configured to fold upwardly to facilitate transport of the tillage implement 10. While the finishing frame 14 has three sections in the illustrated embodiment, in other embodiments, the finishing frame may have more or fewer sections (e.g., 1, 2, 4, 5, or more).

In the illustrated embodiment, the tillage implement 10 includes finishing discs 46 rotatably coupled to the finishing frame 14. As the tillage implement 10 is towed through the field, the finishing discs 46 are driven to rotate, thereby leveling the soil surface and/or cutting residue on the soil surface. Furthermore, in the illustrated embodiment, the tillage implement 10 includes finishing reels 48 movably coupled to the finishing frame 14. In the illustrated embodiment, each finishing reel 48 is pivotally coupled to the finishing frame 14 by respective arm(s) 50. However, in other embodiments, at least one finishing reel may be movably (e.g., rotatably and/or translatably) coupled to the finishing frame 14 by other suitable element(s). As the tillage implement 10 is towed through the field, the finishing reels 48 are driven to rotate, thereby sizing soil clods and/or smoothing the soil surface.

In the illustrated embodiment, the downforce control system 12 is configured to control a contact force applied by the finishing discs 46 and the finishing reels 48 to the soil. As discussed in detail below, the downforce control system 12 includes a vibration sensor 51 coupled to the finishing frame and configured to output a sensor signal indicative of vibration of the finishing frame 14. In addition, the downforce control system 12 includes a controller communicatively coupled to the vibration sensor and to the frame downforce actuator(s) 44. The controller is configured to receive the sensor signal indicative of the vibration of the finishing frame 14 from the vibration sensor, and the controller is configured to compare a magnitude of the vibration to a maximum threshold magnitude. Furthermore, the controller is configured to output an information signal to a user interface indicative of the frame downforce applied to the finishing frame being insufficient and/or control the frame downforce actuator(s) 44 to increase the frame downforce applied to the finishing frame in response to determining the magnitude of the vibration is greater than the maximum threshold magnitude. Increasing the frame downforce applied to the finishing frame may increase the contact force applied by the finishing discs 46 to the soil, thereby reducing the magnitude of the vibration. As a result, the soil levelness may be enhanced, which may reduce water ponding and/or increase crop yield.

While the tillage implement 10 includes disc blades 30, tillage point assemblies 34, finishing discs 46, and finishing reels 48 in the illustrated embodiment, in other embodiments, the tillage implement may include other/additional ground engaging tool(s). For example, in certain embodiments, the disc blades, the tillage point assemblies, the finishing discs, the finishing reels, or a combination thereof, may be omitted. Furthermore, in certain embodiments, the ground engaging tools of the agricultural implement may include plow(s), harrow(s), fertilizer spreader(s), tine(s), other suitable ground engaging tool(s), or a combination thereof.

Figure 2:
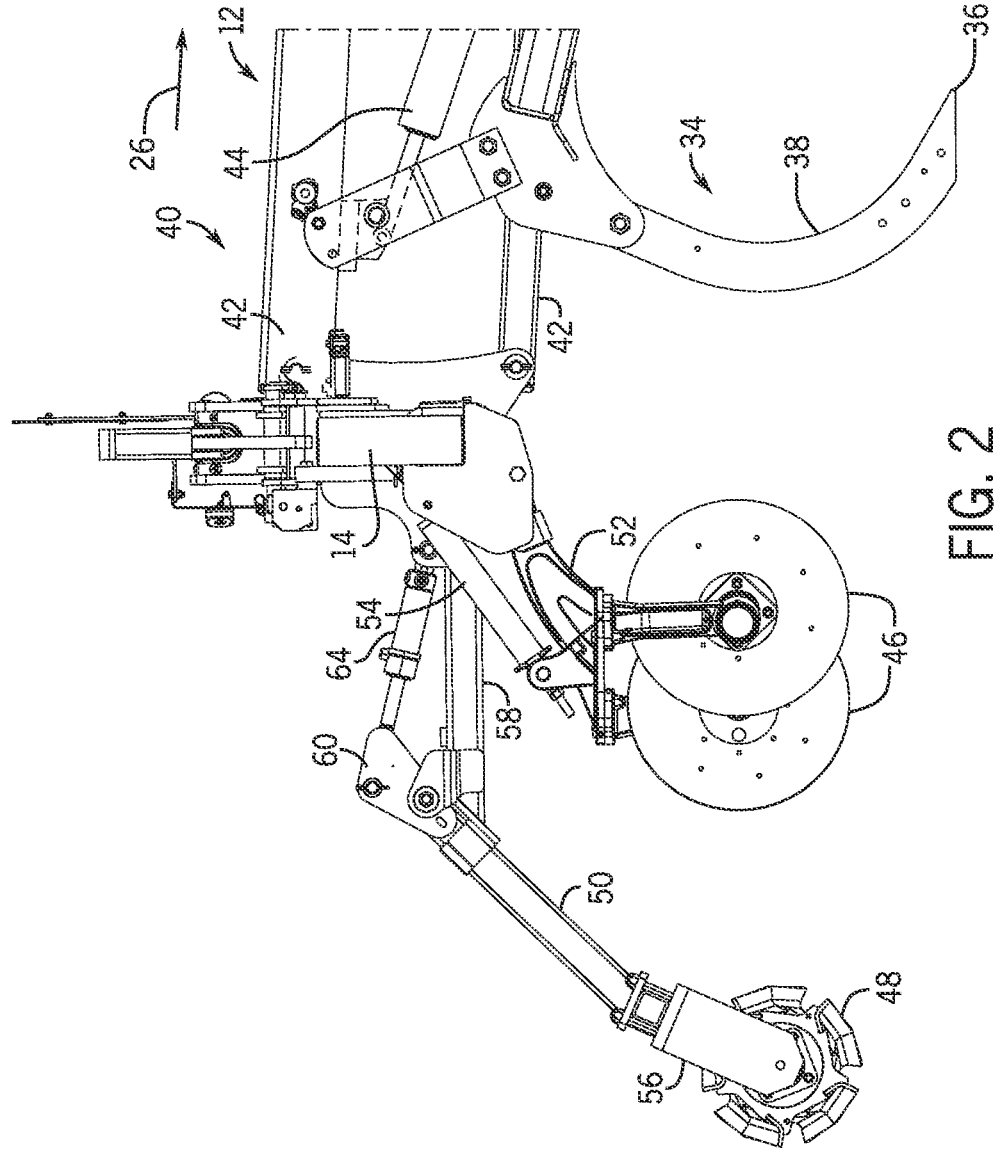
FIG. 2 is a side view of the finishing frame of FIG. 1.

FIG. 2 is a side view of the finishing frame 14 of FIG. 1. As previously discussed, the sets of links 42 of the linkage assembly 40 movably couple the finishing frame 14 to the main frame, thereby enabling the finishing frame 14 to move vertically relative to the main frame. In addition, the downforce actuators 44 are configured to apply a frame downforce to the finishing frame 14, thereby urging the finishing frame toward the soil surface. As the frame downforce applied to the finishing frame 14 increases, the contact force applied by the finishing discs 46 to the soil may increase, and as the frame downforce applied to the finishing frame 14 decreases, the contact force applied by the finishing discs 46 to the soil may decrease.

In the illustrated embodiment, the finishing discs 46 are rotatably coupled to finishing disc supports 52, and the finishing disc supports 52 are pivotally coupled to the finishing frame 14, such that the finishing discs 46 are rotatably coupled to the finishing frame 14. In addition, pneumatic cylinders 54 urge the finishing disc supports 52 toward the soil surface, thereby urging the finishing discs 46 into the soil. Accordingly, to increase the contact force applied by the finishing discs 46 to the soil, the frame downforce actuators 44 may drive the finishing frame 14 toward the soil surface, thereby compressing the pneumatic cylinders 54. As a result, the contact force applied by the finishing discs 46 to the soil increases. While pneumatic cylinders 54 urge the finishing disc supports 52 toward the soil surface in the illustrated embodiment, in other embodiments, other suitable biasing device(s) (e.g., alone or in combination with the pneumatic cylinder(s)) may be used to urge at least one finishing disc support toward the soil surface, such as spring(s), hydraulic cylinder(s), resilient member(s), other suitable biasing device(s), or a combination thereof. Furthermore, in certain embodiments, the biasing device(s) may be omitted for at least one finishing disc support, and the at least one finishing disc support may be rigidly coupled to the finishing frame. In addition, in certain embodiments, at least one finishing disc support may be omitted, and the respective finishing disc(s) may be directly rotatably coupled to the finishing frame. While the finishing discs 46 are rotatably coupled to the finishing frame 14 in the illustrated embodiment, in other embodiments, other or additional suitable ground engaging tool(s) may be coupled to the finishing frame (e.g., tines, etc.).

In the illustrated embodiment, the finishing reels 48 are rotatably coupled to respective finishing reel supports 56, and the finishing reel supports 56 are movably coupled to the finishing frame 14, such that the finishing reels 48 are movably coupled to the finishing frame 14. Furthermore, each finishing reel support 56 is rigidly coupled to respective arm(s) 50 (e.g., two arms 50), and each arm 50 is pivotally coupled to a respective mount 58, which is rigidly coupled to the finishing frame 14. Accordingly, the finishing reels 48 may move vertically via rotation of the arms 50. In addition, a pivoting member 60 is rigidly coupled to each arm 50 and pivotally coupled to the respective mount 58. Furthermore, the downforce control system 12 includes a reel downforce actuator 64 coupled to each pivoting member 60 and to the finishing frame 14. The reel downforce actuators 64 are configured to urge the arms 50 to rotate, thereby urging the finishing reels 48 into the soil. Accordingly, each reel downforce actuator 64 is configured to apply a reel downforce to a respective finishing reel 48 to urge the finishing reel 48 into the soil. In the illustrated embodiment, two reel downforce actuators 64 urge each finishing reel 48 into the soil. However, in other embodiments, more or fewer reel downforce actuators (e.g., 1, 3, 4, or more) may urge at least one finishing reel into the soil. Furthermore, while each reel downforce actuator 64 is coupled to a respective pivot member 60 and to the reel frame 14 in the illustrated embodiment, in other embodiments, at least one reel downforce actuator may be coupled to the respective arm and/or to the respective mount. In addition, in certain embodiments, at least one reel downforce actuator may be coupled to other suitable component(s). In embodiments in which the reel downforce actuator is not coupled to the pivot member, the pivot member may be omitted. In addition, in certain embodiments, at least one mount may be omitted, and the respective arm(s) may be directly pivotally coupled to the finishing frame.

Figure 3:
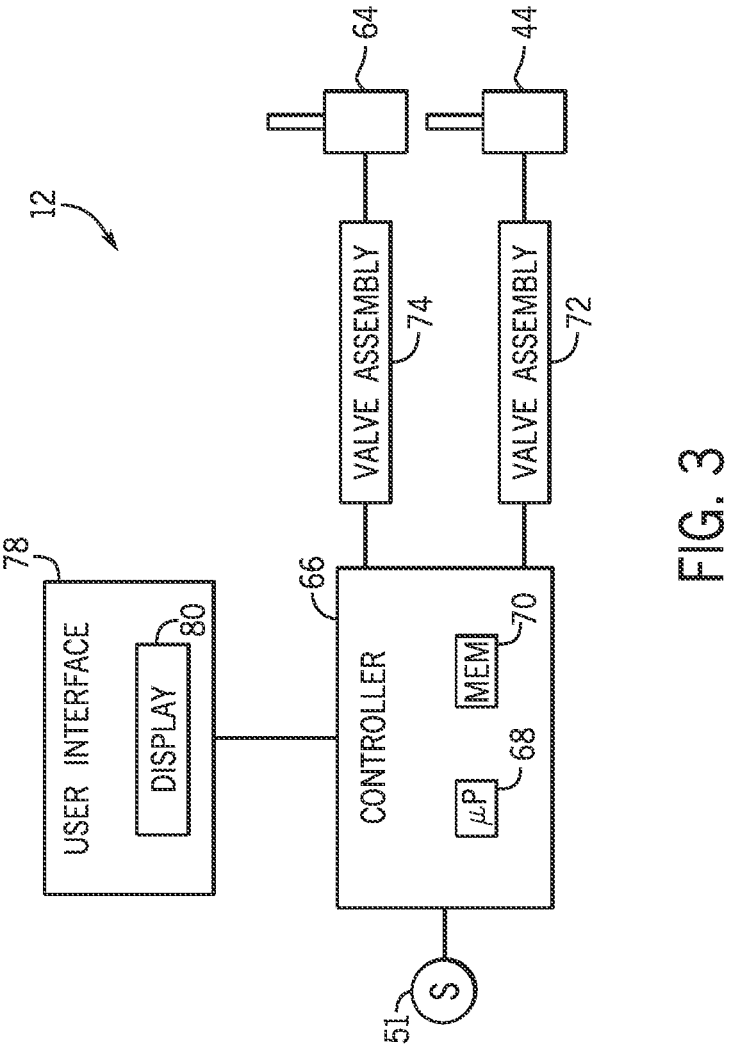
FIG. 3 is a block diagram of an embodiment of a downforce control system for the finishing frame of FIG. 1.

FIG. 3 is a block diagram of an embodiment of a downforce control system 12 for the finishing frame of FIG. 1. In the illustrated embodiment, the downforce control system 12 includes a controller 66 configured to control the downforce applied to the finishing frame. In certain embodiments, the controller 66 is an electronic controller having electrical circuitry configured to control each frame downforce actuator 44 and each reel downforce actuator 64. In the illustrated embodiment, the controller 66 includes a processor, such as the illustrated microprocessor 68, and a memory device 70. The controller 66 may also include one or more storage devices and/or other suitable components. The processor 68 may be used to execute software, such as software for controlling the frame downforce actuator(s) 44 and the reel downforce actuator(s) 64, and so forth. Moreover, the processor 68 may include multiple microprocessors, one or more "general-purpose" microprocessors, one or more special-purpose microprocessors, and/or one or more application specific integrated circuits (ASICs), or some combination thereof. For example, the processor 68 may include one or more reduced instruction set (RISC) processors.

The memory device 70 may include a volatile memory, such as random access memory (RAM), and/or a nonvolatile memory, such as read-only memory (ROM). The memory device 70 may store a variety of information and may be used for various purposes. For example, the memory device 70 may store processor-executable instructions (e.g., firmware or software) for the processor 68 to execute, such as instructions for controlling the frame downforce actuator(s) 44 and the reel downforce actuator(s) 64, and so forth. The storage device(s) (e.g., nonvolatile storage) may include ROM, flash memory, a hard drive, or any other suitable optical, magnetic, or solid-state storage medium, or a combination thereof. The storage device(s) may store data, instructions (e.g., software or firmware for controlling the frame downforce actuator(s) 44 and the reel downforce actuator(s) 64, etc.), and any other suitable data.

In certain embodiments, the frame downforce actuator 44 includes a hydraulic actuator. In such embodiments, the downforce control system 12 includes a valve assembly 72 communicatively coupled to the controller 66, and the valve assembly 72 is fluidly coupled to the frame downforce actuator 44. Accordingly, the controller 66 is communicatively coupled to the frame downforce actuator 44 via the valve assembly 72. The valve assembly 72 may be coupled to any suitable portion of the tillage implement (e.g., the main frame, etc.), to the work vehicle towing the tillage implement, to another suitable structure, or a combination thereof (e.g., the valve assembly may be distributed among multiple valve assembly sections). The valve assembly 72 is configured to control fluid flow from a fluid source (e.g., including a reservoir and a pump) to the frame downforce actuator 44 and/or to control fluid flow from the frame downforce actuator 44 to a fluid drain, thereby controlling the frame downforce applied to the finishing frame. In certain embodiments, an accumulator may be disposed along a fluid line interconnecting the valve assembly 72 with the frame downforce actuator 44 to reduce fluid pressure variations.

Furthermore, in certain embodiments, the reel downforce actuator 64 includes a hydraulic actuator. In such embodiments, the downforce control system 12 includes a valve assembly 74 communicatively coupled to the controller 66, and the valve assembly 74 is fluidly coupled to the reel downforce actuator 64. Accordingly, the controller 66 is communicatively coupled to the reel downforce actuator 64 via the valve assembly 74. The valve assembly 74 may be coupled to any suitable portion of the tillage implement (e.g., the main frame, etc.), to the work vehicle towing the tillage implement, to another suitable structure, or a combination thereof (e.g., the valve assembly may be distributed among multiple valve assembly sections). The valve assembly 74 is configured to control fluid flow from a fluid source (e.g., including a reservoir and a pump) to the reel downforce actuator 64 and/or to control fluid flow from the reel downforce actuator 64 to a fluid drain, thereby controlling the reel downforce applied to the finishing reel. In certain embodiments, an accumulator may be disposed along a fluid line interconnecting the valve assembly 74 with the reel downforce actuator 64 to reduce fluid pressure variations.

While the downforce control system 12 includes two valve assemblies in the illustrated embodiment, in other embodiments, the downforce control system may include a single valve assembly communicatively coupled to the controller and fluidly coupled to the frame downforce actuator and the reel downforce actuator. Furthermore, while one frame downforce actuator 44 and one reel downforce actuator 64 are shown in FIG. 3, in certain embodiments, the downforce control system may include multiple frame downforce actuators (e.g., 2, 3, 4, or more) and/or multiple reel downforce actuators (e.g., 2, 3, 4, 5, 6, 7, 8, 9, 10, or more). In addition, while the frame downforce actuator 44 includes a hydraulic actuator in the illustrated embodiment, in other embodiments, the frame downforce actuator may include a pneumatic actuator. In such embodiments, the controller may be communicatively coupled to the frame downforce actuator via a pneumatic valve assembly. Furthermore, in certain embodiments, the frame downforce actuator may include an electrical actuator (e.g., electric motor, linear actuator, etc.), which may be directly communicatively coupled to the controller (e.g., electrically coupled to the controller). In addition, while the reel downforce actuator 64 includes a hydraulic actuator in the illustrated embodiment, in other embodiments, the reel downforce actuator may include a pneumatic actuator. In such embodiments, the controller may be communicatively coupled to the reel downforce actuator via a pneumatic valve assembly. Furthermore, in certain embodiments, the reel downforce actuator may include an electrical actuator (e.g., electric motor, linear actuator, etc.), which may be directly communicatively coupled to the controller (e.g., electrically coupled to the controller).

In the illustrated embodiment, the downforce control system 12 includes a vibration sensor 51 communicatively coupled to the controller 66. The vibration sensor 51 is coupled to the finishing frame and configured to output a sensor signal indicative of vibration of the finishing frame. The vibration sensor 51 may include any suitable type(s) of vibration sensor(s), such as accelerometer(s), inertial measurement unit(s), gyroscopic sensor(s), piezoelectric sensor(s), optical sensor(s), ultrasonic sensor(s), capacitance sensor(s), other suitable type(s) of sensor(s), or a combination thereof. As discussed in detail below, the controller 66 is configured to receive the sensor signal indicative of the vibration of the finishing frame from the vibration sensor 51 and to compare a magnitude of the vibration to a maximum threshold magnitude. In addition, in certain embodiments, the controller 66 is configured to control the frame downforce actuator 44 to increase the frame downforce applied to the finishing frame in response to determining the magnitude of the vibration is greater than the maximum threshold magnitude. Furthermore, in certain embodiments, the controller 66 is configured to control the reel downforce actuator 64 to decrease the reel downforce applied to the finishing reel (e.g., to substantially maintain a contact force between the finishing reel and the soil as the frame downforce varies).

In the illustrated embodiment, the downforce control system 12 includes a user interface 78 communicatively coupled to the controller 66. The user interface 78 is configured to receive input from an operator and to provide information to the operator. The user interface 78 may include any suitable input device(s) for receiving input, such as a keyboard, a mouse, button(s), switch(es), knob(s), other suitable input device(s), or a combination thereof. In addition, the user interface 78 may include any suitable output device(s) for presenting information to the operator, such as speaker(s), indicator light(s), other suitable output device(s), or a combination thereof. In the illustrated embodiment, the user interface 78 includes a display 80 configured to present visual information to the operator. In certain embodiments, the display 80 may include a touchscreen interface configured to receive input from the operator. In certain embodiments, the controller 66 is configured to output an information signal to the user interface 78 indicative of the frame downforce applied to the finishing frame being insufficient in response to determining the magnitude of the vibration is greater than the maximum threshold magnitude.

Figure 4:
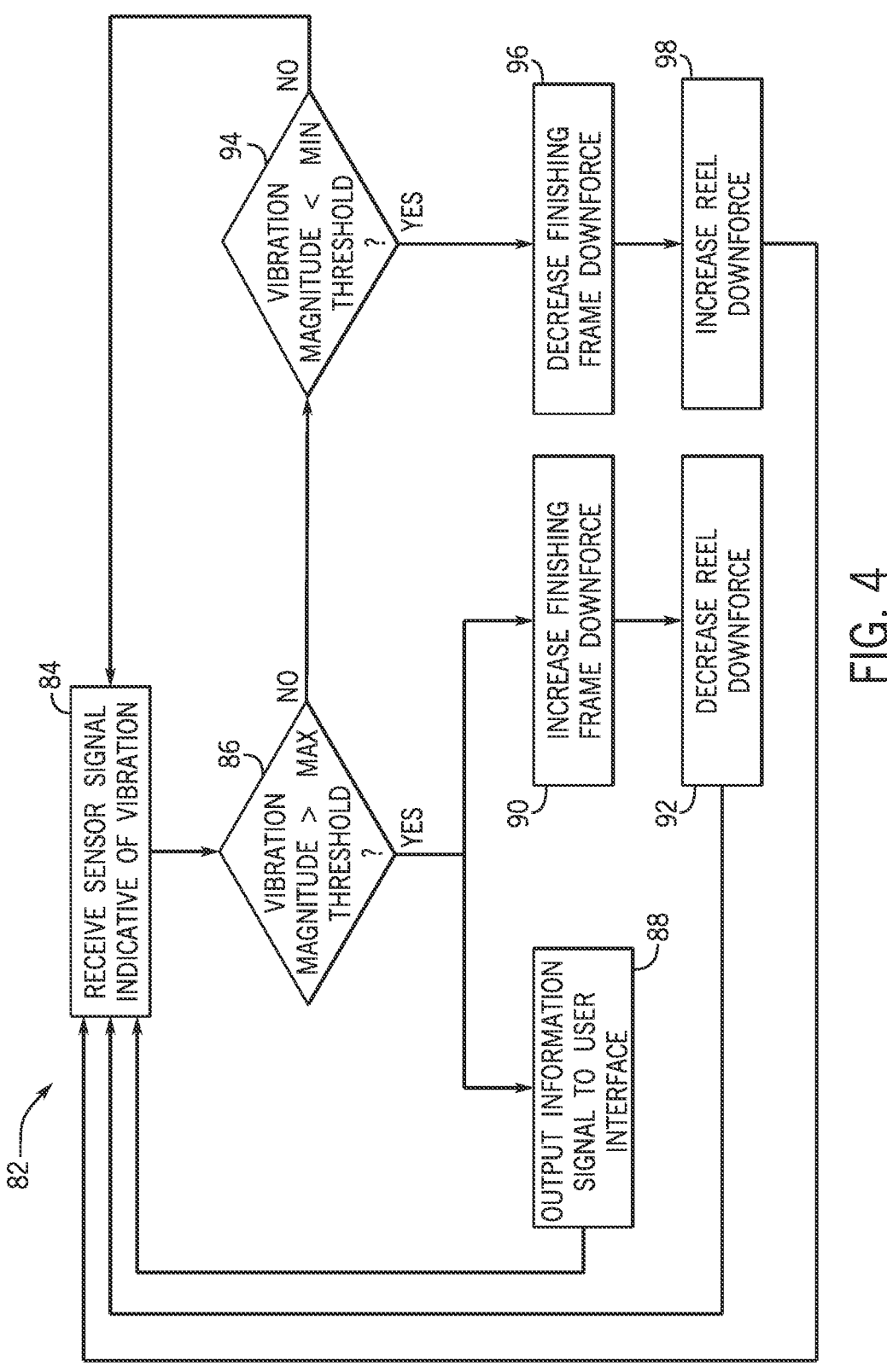
FIG. 4 is a flow diagram of an embodiment of a method for controlling downforce on a finishing frame of a tillage implement.

FIG. 4 is a flow diagram of an embodiment of a method 82 for controlling downforce on a finishing frame of a tillage implement. The method 82 may be performed by the controller disclosed above with referenced to FIG. 3 or any other suitable controller(s). Furthermore, the steps of the method 82 may be performed in the order disclosed herein or in any other suitable order. For example, certain steps of the method may be performed concurrently. In addition, in certain embodiments, at least one of the steps of the method 82 may be omitted.

First, as represented by block 84, a sensor signal indicative of vibration of the finishing frame is received. As previously discussed, the sensor signal may be output by the vibration sensor coupled to the finishing frame. Next, the magnitude of the vibration is compared to a maximum threshold magnitude, as represented by block 86. In certain embodiments, a current/present (e.g., instantaneous) vibration magnitude may be compared to the maximum threshold magnitude. However, in other embodiments, a time-averaged vibration magnitude (e.g., time-averaged over 1 second, 5 seconds, 10 seconds, etc.) may be compared to the maximum threshold magnitude.

In response to determining the magnitude of the vibration is greater than the maximum threshold magnitude, an information signal is output to the user interface indicative of the frame downforce applied to the finishing frame being insufficient, as represented by block 88. The user interface, in turn, may inform the operator that the downforce applied to the finishing frame is insufficient (e.g., via a visual indication on the display, via an audible indication, etc.). In response, the operator may manually increase the frame downforce applied to the finishing frame to reduce the vibration. Additionally or alternatively, in response to determining the magnitude of the vibration is greater than the maximum threshold magnitude, the frame downforce actuator is controlled to increase the frame downforce applied to the finishing frame, as represented by block 90. Increasing the frame downforce applied to the finishing frame (e.g., manually or automatically) may increase the contact force applied by the finishing discs to the soil, thereby reducing the magnitude of the vibration. As a result, the soil levelness may be enhanced, which may reduce water ponding and/or increase crop yield.

Furthermore, in certain embodiments, in response to determining the magnitude of the vibration is greater than the maximum threshold magnitude, the reel downforce actuator is controlled to decrease the reel downforce applied to the finishing reel, as represented by block 92. As a result, the contact force applied by the finishing reel to the soil is reduced, thereby increasing the soil clod size. Accordingly, erosion associated with undesirably small clod sizing may be reduced. In certain embodiments, the reel downforce actuator may be controlled to substantially maintain the contact force between the finishing reel and the soil as the frame downforce varies, thereby substantially maintaining the clod size. As used herein with regard to the contact force between the finishing reel and the soil, "substantially maintain" refers to maintaining the contact force within a threshold variation of 10 percent, 5 percent, 2 percent, 1 percent, or 0.5 percent. Furthermore, in certain embodiments, the step of decreasing the reel downforce may be omitted.

In certain embodiments, in response to determining the magnitude of the vibration is not greater than the maximum threshold magnitude, the magnitude of the vibration is compared to a minimum threshold magnitude, as represented by block 94. In certain embodiments, a current/present (e.g., instantaneous) vibration magnitude may be compared to the minimum threshold magnitude. However, in other embodiments, a time-averaged vibration magnitude (e.g., time-averaged over 1 second, 5 seconds, 10 seconds, etc.) may be compared to the minimum threshold magnitude. In response to determining the magnitude of the vibration is not less than the minimum threshold magnitude, the method 82 returns to block 84.

In response to determining the magnitude of the vibration is less than the minimum threshold magnitude, the frame downforce actuator is controlled to decrease the frame downforce applied to the finishing frame, as represented by block 96. Decreasing the frame downforce applied to the finishing frame may reduce the contact force applied by the finishing discs to the soil, thereby reducing a draft load on the work vehicle towing the tillage implement. As a result, fuel usage during the tillage operation may be reduced. In certain embodiments, in response to determining the magnitude of the vibration is less than the minimum threshold magnitude, an information signal may be output to the user interface indicative of the frame downforce applied to the finishing frame being greater than desired (e.g., alone or in combination with automatically decreasing the frame downforce applied to the finishing frame). The user interface, in turn, may inform the operator that the downforce applied to the finishing frame is greater than desired (e.g., via a visual indication on the display, via an audible indication, etc.). In response, the operator may manually reduce the frame downforce applied to the finishing frame to reduce the draft load (e.g., in embodiments in which the frame downforce is not automatically decreased).

Furthermore, in certain embodiments, in response to determining the magnitude of the vibration is less than the minimum threshold magnitude, the reel downforce actuator is controlled to increase the reel downforce applied to the finishing reel, as represented by block 98. As a result, the contact force applied by the finishing reel to the soil is increased, thereby decreasing the soil clod size. Accordingly, machine bounce during subsequent agricultural operations (e.g., planting operations, seeding operations, etc.) associated with undesirably large clod sizing may be reduced. In certain embodiments, the reel downforce actuator may be controlled to substantially maintain the contact force between the finishing reel and the soil as the frame downforce varies, thereby substantially maintaining the clod size. After outputting the information signal, as represented by block 88, increasing the frame downforce (e.g., in embodiments in which the reel downforce is not decreased), as represented by block 90, decreasing the reel downforce, as represented by block 92, decreasing the frame downforce (e.g., in embodiments in which the reel downforce is not increased), as represented by block 96, or increasing the reel downforce, as represented by block 98, the method 82 may return to block 84, thereby repeating the method 82 (e.g., throughout the duration of the tillage process). In certain embodiments, the step of comparing the vibration magnitude to the minimum threshold magnitude, the step of decreasing the frame downforce, the step of increasing the reel downforce, or a combination thereof, may be omitted.

As previously discussed, the vibration magnitude is compared to the maximum threshold magnitude at block 86, and the vibration magnitude is compared to the minimum threshold magnitude at block 94. However, in certain embodiments, at least one comparison may be based on a threshold duration. For example, in certain embodiments, in response to determining the vibration magnitude is greater than the maximum threshold magnitude for more than a threshold duration, the method may proceed to outputting the information signal, as represented by block 88, or increasing the frame downforce, as represented by block 90. Furthermore, in certain embodiments, in response to determining the vibration magnitude is less than the minimum threshold magnitude for more than a threshold duration, the method may proceed to decreasing the frame downforce, as represented by block 96.

In certain embodiments, the increment for increasing the frame downforce, the increment for decreasing the frame downforce, the increment for decreasing the reel downforce, the increment for increasing the reel downforce, or a combination thereof, may be fixed. For example, in certain embodiments, the increment for increasing the frame downforce and the increment for decreasing the frame downforce may be fixed and equal to one another. In other embodiments, the increment for increasing the frame downforce and the increment for decreasing the frame downforce may be fixed and different than one another. Furthermore, in certain embodiments, the increment for decreasing the reel downforce and the increment for increasing the reel downforce may be fixed and equal to one another. In other embodiments, the increment for decreasing the reel downforce and the increment for increasing the reel downforce may be fixed and different than one another. In addition, in certain embodiments, at least one increment may be variable. For example, the increment for increasing the frame downforce and/or the increment for decreasing the reel downforce may be based on the difference between the vibration magnitude and the maximum threshold magnitude, and/or the increment for decreasing the frame downforce and/or the increment for increasing the reel downforce may be based on the difference between the vibration magnitude and the minimum threshold magnitude. Furthermore, in certain embodiments, the increment for decreasing the reel downforce may be based on the increment for increasing the frame downforce, and/or the increment for increasing the reel downforce may be based on the increment for decreasing the frame downforce.

Figure 5:
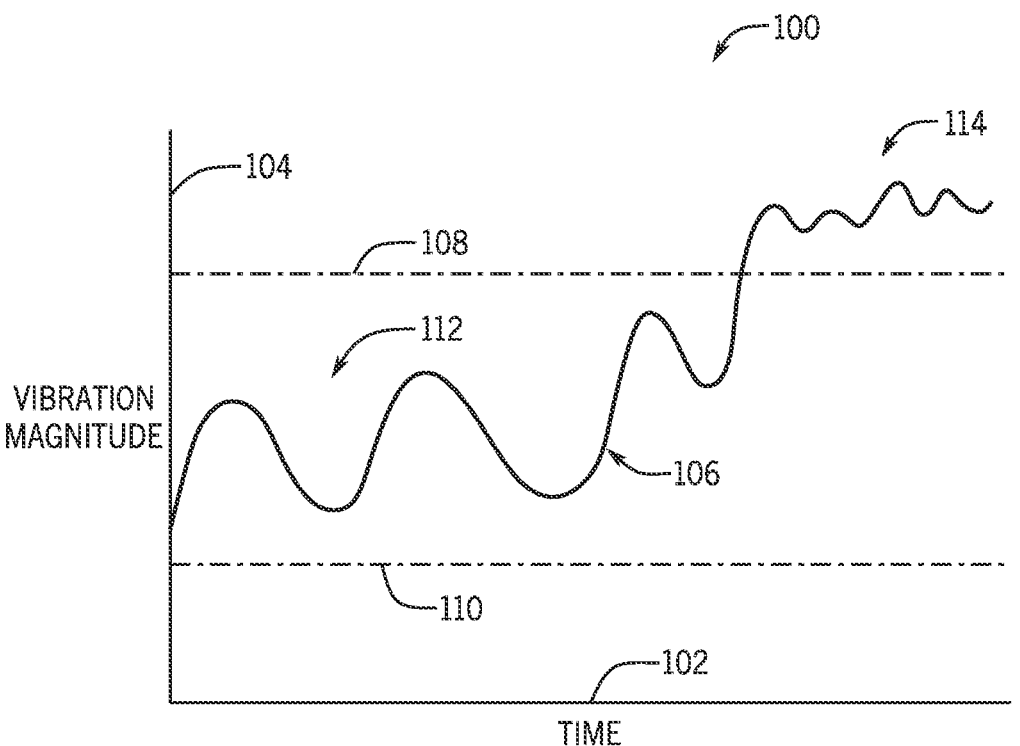
FIG. 5 is a graph of an embodiment of vibration of a finishing frame.

FIG. 5 is a graph 100 of an embodiment of vibration of a finishing frame. As illustrated, the x-axis 102 of the graph 100 represents time, and the y-axis 104 of the graph 100 represents vibration magnitude. In addition, the graph 100 includes a vibration curve 106, which represents the magnitude of the vibration of the finishing frame during operation of the tillage implement (e.g., while the tillage implement is moving through the field and tilling soil). Furthermore, the graph 100 includes an upper dashed line 108, which represents the maximum threshold magnitude, and a lower dashed line 110, which represents the minimum threshold magnitude. As previously discussed, in certain embodiments, in response to determining the magnitude of the vibration is greater than the maximum threshold magnitude, an information signal is output to the user interface indicative of the frame downforce applied to the finishing frame being insufficient. Additionally or alternatively, in response to determining the magnitude of the vibration is greater than the maximum threshold magnitude, the frame downforce actuator is controlled to increase the frame downforce applied to the finishing frame. Furthermore, in certain embodiments, in response to determining the magnitude of the vibration is greater than the maximum threshold magnitude, the reel downforce actuator is controlled to decrease the reel downforce applied to the finishing reel. In addition, as previously discussed, in certain embodiments, in response to determining the magnitude of the vibration is less than the minimum threshold magnitude, an information signal is output to the user interface indicative of the frame downforce applied to the finishing frame being greater than desired. Additionally or alternatively, in response to determining the magnitude of the vibration is less than the minimum threshold magnitude, the frame downforce actuator is controlled to decrease the frame downforce applied to the finishing frame. Furthermore, in certain embodiments, in response to determining the magnitude of the vibration is less than the minimum threshold magnitude, the reel downforce actuator is controlled to increase the reel downforce applied to the finishing reel.

In the illustrated embodiment, a first portion 112 of the vibration curve 106 is less than the maximum threshold magnitude and greater than the minimum threshold magnitude. Accordingly, an information signal is not output, the frame actuator is not controlled to adjust the frame downforce, and the reel downforce actuator is not controlled to adjust the reel downforce. In addition, a second portion 114 of the vibration curve 106 is greater than the maximum threshold magnitude. Accordingly, an information signal may be output to the user interface indicative of the frame downforce applied to the finishing frame being insufficient. Additionally or alternatively, the frame downforce actuator may be controlled to increase the frame downforce applied to the finishing frame. Furthermore, in certain embodiments, the reel downforce actuator may be controlled to decrease the reel downforce applied to the finishing reel.

In certain embodiments, the vibration sensor is configured to monitor oscillation of acceleration of the finishing frame along a single axis or direction of vibration (e.g., linear axis/direction or curved axis/direction). In certain embodiments, the axis/direction of vibration extends along a path of movement of the finishing frame relative to the main frame. In the embodiments disclosed herein, the finishing frame is configured to move vertically relative to the main frame. Accordingly, the axis/direction of vibration extends along a vertical axis (e.g., along an axis perpendicular to the soil surface). However, in other embodiments, the finishing frame may be configured to pivot about a lateral axis relative to the main frame. In such embodiments, the axis/direction of vibration may extend along a curved path about the lateral axis. Furthermore, in certain embodiments, the vibration sensor may be configured to monitor oscillation of acceleration of the finishing frame along an axis/direction that is angled relative to the path of movement of the finishing frame relative to the main frame. In addition, the vibration sensor may be configured to monitor oscillation of acceleration of the finishing frame along multiple axes (e.g., 2, 3, or more).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A downforce control system for a finishing frame of a tillage implement, comprising:
   a controller comprising a processor and a memory, wherein the controller is configured to:
      receive a sensor signal indicative of vibration of the finishing frame, wherein the finishing frame is configured to be movably coupled to a main frame of the tillage implement and to be urged toward a surface of soil via application of a frame downforce from a frame downforce actuator;
      compare a magnitude of the vibration to a maximum threshold magnitude; and
      control the frame downforce actuator to increase the frame downforce applied to the finishing frame and control a reel downforce actuator to decrease a reel downforce applied to a finishing reel of the tillage implement in response to determining the magnitude of the vibration is greater than the maximum threshold magnitude;
   wherein the finishing reel is configured to be movably coupled to the finishing frame and to be urged into the soil via application of the reel downforce from the reel downforce actuator.

2. The downforce control system of claim 1, wherein the controller is configured to:

compare the magnitude of the vibration to a minimum threshold magnitude; and control the frame downforce actuator to decrease the frame downforce applied to the finishing frame in response to determining the magnitude of the vibration is less than the minimum threshold magnitude.

3. The downforce control system of claim 1, wherein the controller is configured to control the reel downforce actuator to substantially maintain a contact force between the finishing reel and the soil as the frame downforce varies.

4. The downforce control system of claim 1, wherein the controller is configured to:

compare the magnitude of the vibration to a minimum threshold magnitude; and control the frame downforce actuator to decrease the frame downforce applied to the finishing frame and control the reel downforce actuator to increase the reel downforce applied to the finishing reel in response to determining the magnitude of the vibration is less than the minimum threshold magnitude.

5. The downforce control system of claim 4, wherein the controller is configured to control the reel downforce actuator to substantially maintain a contact force between the finishing reel and the soil as the frame downforce varies.

6. The downforce control system of claim 1, wherein the controller is configured to output an information signal to a user interface indicative of the frame downforce applied to the finishing frame being insufficient in response to determining the magnitude of the vibration is greater than the maximum threshold magnitude.

7. A downforce control system for a finishing frame of a tillage implement, comprising:

a vibration sensor configured to be coupled to the finishing frame and to output a sensor signal indicative of vibration of the finishing frame, wherein the finishing frame is configured to be movably coupled to a main frame of the tillage implement;

a frame downforce actuator configured to apply a frame downforce to the finishing frame to urge the finishing frame toward a surface of soil;

a reel downforce actuator configured to apply a reel downforce to a finishing reel of the tillage implement to urge the finishing reel into the soil, and the finishing reel is configured to movably couple to the finishing frame; and a controller comprising a processor and a memory, wherein the controller is communicatively coupled to the vibration sensor, to the reel downforce actuator, and to the frame downforce actuator, and the controller is configured to:

receive the sensor signal indicative of the vibration of the finishing frame from the vibration sensor;

compare a magnitude of the vibration to a maximum threshold magnitude; and control the frame downforce actuator to increase the frame downforce applied to the finishing frame and control the reel downforce actuator to decrease the reel downforce applied to the finishing reel in response to determining the magnitude of the vibration is greater than the maximum threshold magnitude.

8. The downforce control system of claim 7, comprising a hydraulic valve assembly communicatively coupled to the controller, wherein the frame downforce actuator comprises a hydraulic cylinder, and the controller is configured to control the hydraulic valve assembly to control the hydraulic cylinder of the frame downforce actuator.

9. The downforce control system of claim 7, wherein the controller is configured to control the reel downforce actuator to substantially maintain a contact force between the finishing reel and the soil as the frame downforce varies.

10. The downforce control system of claim 7, wherein the controller is configured to:

compare the magnitude of the vibration to a minimum threshold magnitude; and control the frame downforce actuator to decrease the frame downforce applied to the finishing frame and control the reel downforce actuator to increase the reel downforce applied to the finishing reel in response to determining the magnitude of the vibration is less than the minimum threshold magnitude.

11. The downforce control system of claim 7, comprising a hydraulic valve assembly communicatively coupled to the controller, wherein the reel downforce actuator comprises a hydraulic cylinder, and the controller is configured to control the hydraulic valve assembly to control the hydraulic cylinder of the reel downforce actuator.

12. The downforce control system of claim 7, wherein the controller is configured to output an information signal to a user interface indicative of the frame downforce applied to the finishing frame being insufficient in response to determining the magnitude of the vibration is greater than the maximum threshold magnitude.

13. A tillage implement, comprising:

a main frame;

a finishing frame movably coupled to the main frame;

a finishing reel movably coupled to the finishing frame; and a downforce control system, comprising:

a vibration sensor coupled to the finishing frame and configured to output a sensor signal indicative of vibration of the finishing frame;

a frame downforce actuator configured to apply a frame downforce to the finishing frame to urge the finishing frame toward a surface of soil;

a reel downforce actuator configured to apply a reel downforce to the finishing reel to urge the finishing reel into the soil; and a controller comprising a processor and a memory, wherein the controller is communicatively coupled to the vibration sensor, to the reel downforce actuator, and to the frame downforce actuator, and the controller is configured to:

receive the sensor signal indicative of the vibration of the finishing frame from the vibration sensor;

compare a magnitude of the vibration to a maximum threshold magnitude; and control the frame downforce actuator to increase the frame downforce applied to the finishing frame and control the reel downforce actuator to decrease the reel downforce applied to the finishing reel in response to determining the magnitude of the vibration is greater than the maximum threshold magnitude.

14. The tillage implement of claim 13, wherein the downforce control system comprises a hydraulic valve assembly communicatively coupled to the controller, the frame downforce actuator comprises a hydraulic cylinder, and the controller is configured to control the hydraulic valve assembly to control the hydraulic cylinder of the frame downforce actuator.

15. The tillage implement of claim 13, wherein the controller is configured to control the reel downforce actuator to substantially maintain a contact force between the finishing reel and the soil as the frame downforce varies.

16. The tillage implement of claim 13, wherein the controller is configured to:

compare the magnitude of the vibration to a minimum threshold magnitude; and control the frame downforce actuator to decrease the frame downforce applied to the finishing frame and control the reel downforce actuator to increase the reel downforce applied to the finishing reel in response to determining the magnitude of the vibration is less than a minimum threshold magnitude.

17. The tillage implement of claim 13, wherein the downforce control system comprises a hydraulic valve assembly communicatively coupled to the controller, the reel downforce actuator comprises a hydraulic cylinder, and the controller is configured to control the hydraulic valve assembly to control the hydraulic cylinder of the reel downforce actuator.

18. The tillage implement of claim 13, wherein the controller is configured to output an information signal to a user interface indicative of the frame downforce applied to the finishing frame being insufficient in response to determining the magnitude of the vibration is greater than the maximum threshold magnitude.

* * * * *